United States Patent
Heiliger et al.

(10) Patent No.: US 6,602,926 B1
(45) Date of Patent: Aug. 5, 2003

(54) CATALYST SYSTEM FOR THE NCO/OH REACTION (POLYURETHANE FORMATION)

(75) Inventors: Ludger Heiliger, Neustadt (DE); Reinhard Montag, Ketsch (DE)

(73) Assignee: Rhein Chemie Rheinau GmbH, Mannheim (DE)

(*) Notice: Subject to any disclaimer, the term of this patent is extended or adjusted under 35 U.S.C. 154(b) by 115 days.

(21) Appl. No.: 09/602,858

(22) Filed: Jun. 26, 2000

(30) Foreign Application Priority Data

Jul. 2, 1999 (DE) .......................................... 199 30 556

(51) Int. Cl.$^7$ .............................................. C08G 18/10
(52) U.S. Cl. .................... 521/129; 521/128; 521/170; 521/174; 502/174; 502/200
(58) Field of Search ............................... 521/128, 129, 521/170, 174; 502/174, 200

(56) References Cited

U.S. PATENT DOCUMENTS

| | | |
|---|---|---|
| 3,193,522 A | 7/1965 | Neumann et al. |
| 3,193,523 A | 7/1965 | Neumann et al. |
| 3,776,882 A | 12/1973 | Witzler et al. |
| 4,076,945 A | 2/1978 | Elmer |
| 4,113,676 A | 9/1978 | Niederst |
| 4,849,470 A | 7/1989 | Murphy |
| 5,210,170 A * | 5/1993 | Quiring et al. ............... 528/80 |
| 5,246,993 A | 9/1993 | Scherzer et al. |
| 5,654,479 A | 8/1997 | Lehrich et al. |
| 6,063,824 A * | 5/2000 | Krech et al. ............... 521/121 |

* cited by examiner

Primary Examiner—John M. Cooney, Jr.
(74) Attorney, Agent, or Firm—Joseph C. Gill; Jennifer R. Seng; Noland J. Cheung

(57) ABSTRACT

The present invention relates to a catalyst system for the production of polyurethane comprising catalysts for polyurethane formation and sterically hindered carbodiimides, which system is capable of lessening the "fogging" problem in the production of polyurethane materials, without impairing in particular the aging properties of the polyurethane materials thus produced.

16 Claims, No Drawings

CATALYST SYSTEM FOR THE NCO/OH REACTION (POLYURETHANE FORMATION)

FIELD OF THE INVENTION

The present invention relates to an improved catalyst system for the formation of polyurethane, by means of which the "fogging" problem in the production of polyurethane materials is successfully lessened, without impairing, in particular, the aging properties of the polyurethane materials thus produced.

BACKROUND OF THE INVENTION

It is known that the rate of polyurethane formation (NCO/OH reaction) is affected by the temperature of the raw materials and their structure, but is influenced predominantly by suitable catalysts. Compounds which have proven to be particularly suitable as catalysts for this previously described reaction are, in particular, tertiary amines, salts of weak acids (as basic catalysts) and organometallic compounds, such as organotin compounds (as electrophilic catalysts).

In the production of PU material, it is conventional for the catalysts used to remain in the finished material, provided that these catalysts are non-volatile or can be incorporated.

If volatile catalysts are used, even during the production of the material, they begin to volatilize as a result of the rise in temperature of the exothermic NCO/OH reaction, a feature which is consistent with their low boiling point.

This leads to problems in maintaining industrial hygiene during the production of the PU materials and also to a continuous, slow release into the environment of the portions of volatile catalyst still remaining in the material ("fogging").

However, if, as described above, non-volatile catalysts, i.e. high-boiling catalysts, or catalysts which can be incorporated, are added, the PU materials produced with the aid of these catalysts exhibit poor aging properties due to the presence of these catalysts, because the catalysts in principle accelerate both the forward reaction, i.e. the synthesis, and the backward reaction, i.e. the decomposition or the rearrangement of the PU materials. Physical test methods, such as the Ford test (in accordance with DIN 53 578) can be used as a measure of the decomposition or the impairment of the aging properties.

It is, therefore, usual to be dealing with PU materials which either create considerable problems in maintaining industrial hygiene during production or cause "fogging" problems after their production or, in cases where non-volatile catalysts have been employed, exhibit poor aging properties, especially during long-term use.

Accordingly, the object is to provide PU catalyst systems which entail no problems in maintaining industrial hygiene and no "fogging" problems and, secondly, impart good aging properties to the finished PU material.

SUMMARY OF THE INVENTION

The present invention, therefore, provides a catalyst system comprising

A) at least one catalyst for the NCO/OH reaction (polyurethane formation) and

B) at least one sterically hindered carbodiimide, wherein component B) is present in a quantity of 1 wt. % up to 200 wt. %, based on the total quantity of component A).

DETAILED DESCRIPTION OF THE INVENTION

According to the present invention, particularly preferred catalyst systems are those wherein the sterically hindered carbodimiides B) are present in the catalyst system in quantities of 20 to 180 wt. %, more preferably 50 to 150 wt. %, based on the total quantity of component A).

All the known basic, as well as the electrophilic catalysts, which favor the formation of polyurethane are suitable as catalysts for the NCO/OH reaction. Such catalysts are described, for example, in Kunststoff-Handbuch, Volume 7, Polyurethane, Third newly revised Edition, Carl Hanser Verlag, Munich, Vienna, 1993, pp. 104 to 110.

Catalysts such as those described on page 105 of the above-mentioned publication are particularly suitable.

Such catalysts are, in particular (cyclo)aliphatic tertiary amines corresponding to the formulae (I)

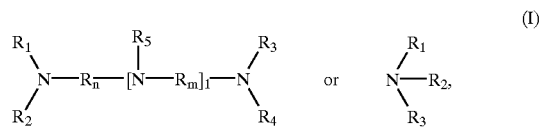

wherein $R_1$ to $R_5$ are identical or different and denote $C_1$–$C_{18}$ alkyl, $C_5$–$C_7$ cycloalkyl, $C_6$–$C_{10}$ aryl and $C_6$–$C_{10}$ arylmethyl or wherein groups $R_1$ and $R_2$ and/or $R_3$ and R4 can be bonded to one another via $C_2$–$C_5$ alkylene groups containing 0 to 2 hetero atoms, such as nitrogen, sulfur or oxygen, in the carbon chain, n denotes integers from 2 to 6, m denotes the numbers 2 and 3 and l denotes integers from 0 to 4.

Also to be mentioned are (cyclo)aliphatic aminoethers corresponding to formula (II)

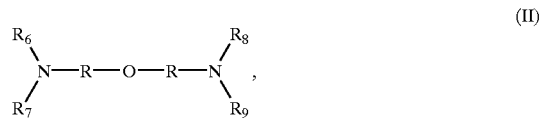

wherein $R_6$ to $R_9$ have the same meanings as groups $R_1$ to $R_5$ and R denotes $C_1$–$C_6$ alkylene groups.

Also to be mentioned are (cyclo)aliphatic amidines corresponding to formula (III)

wherein $R_{10}$ to $R_{13}$ have the same meanings as groups $R_1$ to $R_5$ or $R_{10}$ and $R_{13}$ and/or $R_{11}$ and $R_{12}$ can be bonded to one another via $C_2$–$C_5$ alkylene groups.

Also to be mentioned are bicyclic diamines corresponding to formula (IV)

wherein

R has the same meaning as R in formula (II).

Also to be mentioned are organotin compounds corresponding to formula (V)

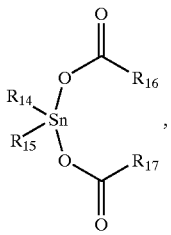

wherein $R_{14}$ and $R_{15}$ have the same meanings as groups $R_1$ to $R_5$, with the proviso that groups $R_{14}$ and $R_{15}$ are omitted when the tin is divalent.

Also to be mentioned are metal carboxylates corresponding to formula (VI)

$$R_{18}\text{—COOM} \qquad (VI),$$

wherein $R_{18}$ denotes a $C_1$–$C_{18}$ aliphatic or $C_5$–$C_6$ cycloaliphatic alkyl group or a $C_6$–$C_{10}$ aryl group and M denotes an alkali metal, in particular sodium or potassium.

Also to be mentioned are hydroxyl-containing amines corresponding to formula (VII)

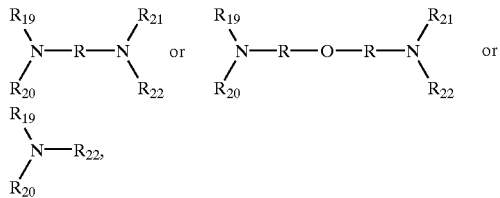

wherein $R_{19}$ to $R_{21}$, have the same meanings as groups $R_1$ to $R_5$ and $R_{22}$ denotes hydroxyethyl.

The following are particularly suitable compounds corresponding to formulae (I) to (VII):

N,N,N',N'',N''-pentamethyldiethylenetriamine (I),
N,N-dimethylbenzylamine (I),
N,N-dimethylcyclohexylamine (I),
M-methylmorpholine (I),
bis(2-dimethylaminoethyl) ether (II),
bis(2-morpholinoethyl) ether (II),
1,5-diazabicyclo[4.3.0]non-5-ene (III),
1,8-diazabicyclo[5.4.0]undec-7-ene (III),
2,3-dimethyl-3,4,5,6-tetrahydro- 1,3-diazine (III),
1,4-diazabicyclo[2.2.2]octane (IV),
tin(II) dioctanoate (V),
tin(II) dipalmitate (V),
di-n-butyltin(IV) dilaurate (V),
potassium acetate (VI),
potassium 2-ethylhexanoate (VI),
N,N-dimethylaminoethoxyethanol (VII),
(N,N-dimethylaminoethyl)-(N'-hydroxyethyl-N'-methylaminoethyl)ether (VII).

The following are particularly preferred:

1,5-diazabicyclo[4.3.0]non-5-ene (III),
1,4-diazabicyclo[2.2.2]octane (IV),
di-n-butyltin(IV) dilaurate (V),
tin(II) dioctanoate (V),
potassium octanoate (VI),
N,N-dimethylaminoethanol (VII).

Sterically hindered carbodiimides used according to the invention include those corresponding to formula (VIII)

$$R_{23}\text{—N=C=N—}R_{24} \qquad (VIII),$$

wherein $R_{23}$ and $R_{24}$ are identical or different and denote

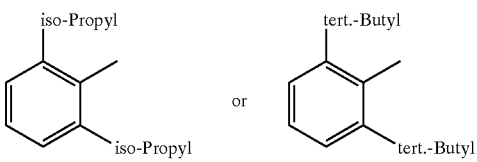

Sterically hindered carbodiimides corresponding to formula (IX) are also suitable $$X\text{—}(\text{—}R_{25}\text{—N=C=N—}R_{25}\text{—})_n\text{—}X \qquad (IX),$$

wherein

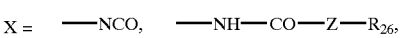

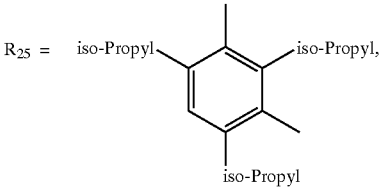

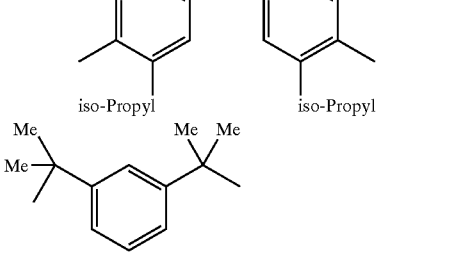

$R_{26}$=$C_1$–$C_{18}$-alkyl, -aryl, -arylalkyl, -alkylenoxyalkyl, -alkoxypolyoxyalkylene

Z=O,NH,S, n=2 to 100.

Sterically hindered carbodiimides corresponding to the following formulae are particularly preferred

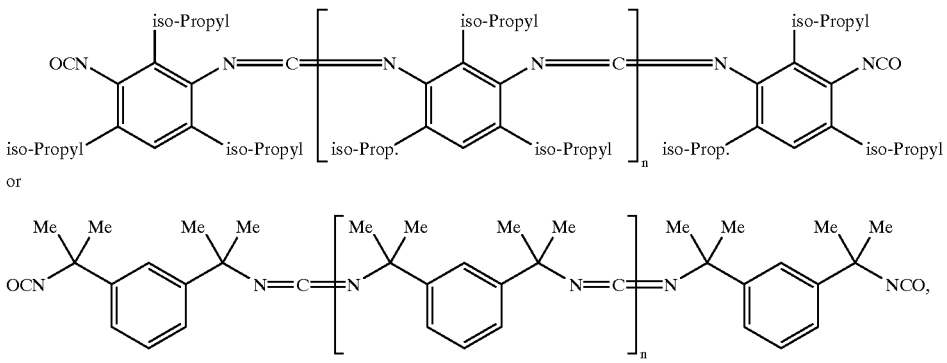

or

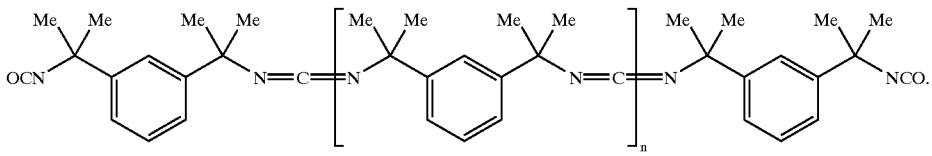

wherein n=2 to 100.

The following is most preferred:

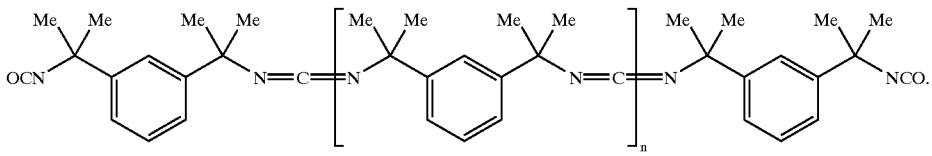

wherein n=2 to 100.

Both the previously mentioned PU catalysts and the sterically hindered carbodiimides may be used individually or mixed with one another; the most favorable mixing ratio for this can be easily determined by appropriate preliminary experiments.

The sterically hindered carbodiimides used according to the present invention are known and are described, for example, in EP 0 628 541, DE 1 494 009, DE 2 020 330, DE 1 285 747, DE 2 248 751, EP 0 460 481 and U.S. Pat. No. 5,246,993.

It is useful to add the catalyst system according to the present invention before the addition to the liquid components of the PU system in dissolved form, provided that the catalyst system according to the present invention is not already in liquid form.

Suitable solvents are particularly those which are used as components in the production of polyurethane; these can be water, polyols, isocyanates, polyisocyanates, blowing agents, plasticizers and foam stabilizers (silicone emulsifiers).

The suitable amount of solvent can be easily determined by appropriate preliminary experiments.

The catalyst system according to the invention is suitable for the production of many different kinds of PU materials, in particular for the production of flexible PU foams and integral PU foams.

The present invention therefore also provides the use of the catalyst systems according to the present invention for the production of PU materials, in particular of flexible PU foams and integral PU foams.

The invention is further illustrated but is not intended to be limited by the following examples in which all parts and percentages are by weight unless otherwise specified.

EXAMPLES

Example 1

(Preparation of a Sterically Hindered Carbodiimide of the Structure IX, With $R_{25}$=1,3-bis(1-Methylethyl) and X=—NH—CO—O—$R_{26}$ with $R_{26}$=Alkoxypolyoxyalkylene).

750 parts by weight (3.1 mol) 1,3-bis(1-methyl-2-isocyanatoethyl)-benzene having an NCO content of 34.4 wt. % was heated to 180° C. in the presence of 1.5 parts by weight 1-methyl-2-phospholene-1-oxide and condensed at this temperature, with release of carbon dioxide. A reaction time of 23 hours was required to attain an NCO content of 9.3 wt. %. Then 957 parts by weight of a methoxypolyoxyethylene alcohol having an average molecular weight (number average) of 520 g/mol was added, with stirring.

At a reaction temperature held constant at 180° C., the terminal NCO groups of the polymer chains were converted into urethane groups within a period of 30 minutes.

Then the 1-methyl-2-phospholene-1-oxide added as catalyst and the rest of the unreacted 1,3-bis(1-methyl-2-isocyanatoethyl)benzene were distilled off at a temperature of 190° C. and at a pressure of 0.5 mbar.

1576 parts by weight of a mixture was obtained; the mixture was free from NCO groups and consisted of monomeric and oligomeric polycarbodiimides having terminal methoxypolyoxyethylene-urethane groups. These polycarbodiimides had a content of N=C=N groups of 50 mg/g, a viscosity, as measured at 25° C. by Ubbelohde's method, of 1950 mPas and an iodine colour index, measured after dilution with monochlorobenzene in the volume ratio of 1:5, of 2.4.

The mixture was very soluble in water.

The structure of the mixture of monomeric and oligomeric polycarbodiimides containing urethane groups was identified by $^1$H—NMR and the IR spectrum.

Structure of the carbodiimide in Example 1:

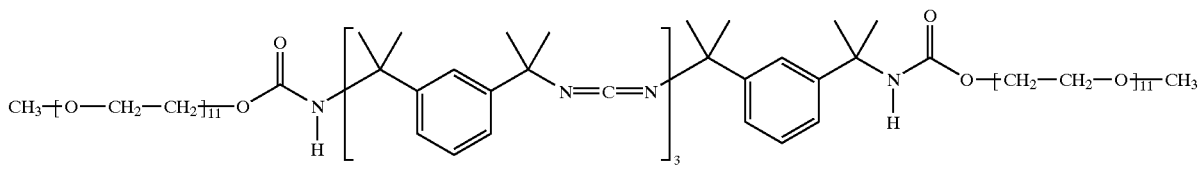

Examples 2–4 (Formulations)

| Example | | 2 | 3 | 4 |
|---|---|---|---|---|
| *1 Desmophen 2220 B ® | Parts by wt. | 100 | 100 | 100 |
| Desmophen 2200 B | | | | |
| Desmodur T80 | | | | |
| Water (total) | Parts by wt. | 4.50 | 4.50 | 4.50 |
| Water (initially weighed) | Parts by wt. | — | 3.50 | 3.50 |
| *2 Stabilizer SE 232 | Parts by wt. | 1.00 | 1.00 | 1.00 |
| *3 Desmorapid DB | Parts by wt. | 0.50 | 0.50 | 0.50 |
| *3 RC PU activator 101 | Parts by wt. | 0.50 | 0.50 | 0.50 |
| *3 RC PU activator 105 | Parts by wt. | 0.50 | 0.50 | 0.50 |
| *4 Stabaxol P 200/$H_2O$ 1/1 | Parts by wt. | — | 1.00 | 1.00 |
| Desmodur T80 ® | Parts by wt. | 54.00 | 54.00 | 54.00 |
| Characteristic value | | 100 | 100 | 100 |
| Temperature | (° C.) | 22/23 | 22/23 | 22/23 |
| Desmophen/Desmodur | | | | |
| Pressure in mixing chamber | (bar) | 1.40 | 1.40 | 1.20 |
| Belt speed | (m min$^{-1}$) | 2.40 | 2.20 | 2.20 |
| Delivery rate of | (kg min$^{-1}$) | 22 | 22 | 22 |
| Starting time | (s) | 14 | 12 | 13 |
| Rising time | (s) | 63 | 62 | 62 |
| Setting time | (s) | 33 | 45 | 45 |

*1 Desmophen 2200 B
Desmodur T80
=> commercial product of Bayer AG
*2 Stabilizer SE 232 is a commercial product of the Witco Corporation
*3 Desmorapid DB, RC PU activator 101/RC PU activator 105 are
commercial products of Rhein Chemie Rheinau GmbH
*4 Substance from Example 1, diluted 1:1 with water

| | | |
|---|---|---|
| Desmodur T80 ® | = | 80% 2,4-tolylene diisocyanate |
| | = | 20% 2,6-tolylene diisocyanate |
| Stabaxol P200 ® | = | highly polymeric carbodiimide |
| | | fp. 80–100° C. |
| RC PU activator ® 105 | = | 33% triethylenediamine |
| | = | 66% propylene glycol |
| RC PU activator ® 101 | = | N-methylmorpholine |
| Desmorapid DB | = | N,N-dimethylbenzylamine |
| Desmophen 2220 B | = | polyester polyol for flexible block foams mainly for technical articles |

Examples 2 to 4

Aging test on the formulations, in accordance with DIN 53 578 120 h, 90° C., 90–95% Lf (Ford test)

| Description | | 2 | 3 | 4 |
|---|---|---|---|---|
| Pressure test | kPa | 5.35 | 5.33 | 5.26 |
| 40% compression | | 5.29 | 5.23 | 5.08 |
| Pressure test after storage | kPa | 3.02 | 3.41 | 3.32 |
| Change in the pressure test | % | −44 | −36 | −37 |
| Compression set 50% compression | | | | |
| Blank value after storage | % | 4.0 22.4 | 4.5 9.8 | 4.7 9.7 |
| Tensile strength | | | | |
| Blank value after storage | kPa kPa | 183 | 184 | 178 |

The results show that the foams containing sterically hindered carboduimides and amines (3+4) have a significantly better compression set than those lacking the sterically hindered carboduimide (2).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible polyurethane foam comprising a catalyst system for the NCO/OH reaction, which comprises
   A) at least one catalyst for the NCO/OH reaction (polyurethane formation) and
   B) at least one sterically hindered carbodiimide,
   wherein component B) is present in a quantity of 1 wt. % up to 200 wt. %, based on the total quantity of component A).

2. A polyurethane foam according to claim 1, wherein said at least one catalyst for the NCO/OH reaction is:

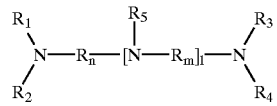

wherein
   $R_1$ to $R_5$ are identical or different and denote $C_1$–$C_{18}$ alkyl, $C_5$–$C_7$ cycloalkyl, $C_6$–$C_{10}$ aryl and $C_6$–$C_{10}$ arylmethyl or wherein groups $R_1$ and $R_2$ and/or $R_3$ and $R_4$ can be bonded to one another via $C_2$–$C_5$ alkylene groups containing 0 to 2 hetero atoms, such as nitrogen, sulfur or oxygen, in the carbon chain,
   n denotes integers from 2 to 6,
   m denotes the numbers 2 and 3 and
   l denotes integers from 0 to 4.

3. A polyurethane foam according to claim 1, wherein said at least one catalyst for the NCO/OH reaction is:

R$_1$ to R$_3$ are identical or different and denote C$_1$–C$_{18}$ alkyl, C$_5$–C$_7$ cycloalkyl, C$_6$–C$_{10}$ aryl and C$_6$–C$_{10}$ aryl-methyl or wherein groups R$_1$ and R$_2$ and/or R$_3$ can be bonded to one another via C$_2$–C$_5$ alkylene groups containing 0 to 2 hetero atoms, such as nitrogen, sulfur or oxygen, in the carbon chain.

4. A polyurethane foam according to claim 1, wherein said at least one catalyst for the NCO/OH reaction is:

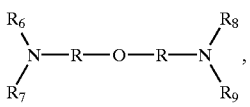
(II)

wherein

R$_6$ to R$_9$ have the same meanings as groups R$_1$ to R$_5$ and R denotes C$_1$–C$_6$ alkylene groups.

5. A polyurethane foam according to claim 1, wherein said at least one catalyst for the NCO/OH reaction is:

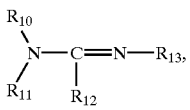
(III)

wherein

R$_{10}$ to R$_{13}$ have the same meanings as groups R$_1$ to R$_5$ or R$_{10}$ and R$_{13}$ and/or R$_{11}$ and R$_{12}$ can be bonded to one another via C$_2$–C$_5$ alkylene groups.

6. A polyurethane foam according to claim 1, wherein said at least one catalyst for the NCO/OH reaction is:

(IV)

wherein

R has the same meaning as R in formula (II).

7. A polyurethane foam according to claim 1, wherein said at least one catalyst for the NCO/OH reaction is:

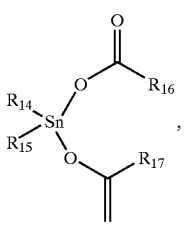
(V)

wherein

R$_{14}$ and R$_{15}$ have the same meanings as groups R$_1$ to R5, with the proviso that groups R$_{14}$ and R$_{15}$ are omitted when the tin is divalent.

8. A polyurethane foam according to claim 1, wherein said at least one catalyst for the NCO/OH reaction is:

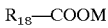
(VI), wherein

R$_{18}$ denotes a C$_1$–C$_{18}$ aliphatic or C$_5$–C$_6$ cycloaliphatic alkyl group or a C$_6$–C$_{10}$ aryl group and M denotes an alkali metal, in particular sodium or potassium.

9. A polyurethane foam according to claim 1, wherein at least one catalyst for the NCO/OH reaction is:

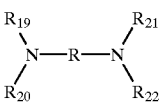

wherein

R$_{19}$ to R$_{12}$ have the same meanings as groups R$_1$ to R$_5$ and R$_{22}$ denotes hydroxyethyl.

10. A polyurethane foam according to claim 1, wherein at least one catalyst for the NCO/OH reaction is:

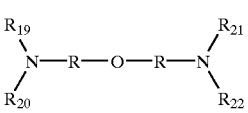

wherein

R$_{19}$ to R$_{21}$ have the same meanings as groups R$_1$ to R$_5$ and R$_{22}$ denotes hydroxyethyl.

11. A polyurethane foam according to claim 1, wherein at least one catalyst for the NCO/OH reaction is:

wherein

R$_{19}$ to R$_{21}$ have the same meanings as groups R$_1$ to R$_5$ and R$_{22}$ denotes hydroxyethyl.

12. A polyurethane foam according to claim 1, wherein said at least one sterically hindered carbodiimide is:

wherein

R$_{23}$ and R$_{24}$ are identical or different and denote

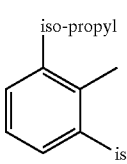 or 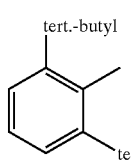

13. A polyurethane foam according to claim 1, wherein said at least one sterically hindered carbodiimide is:

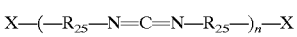

wherein

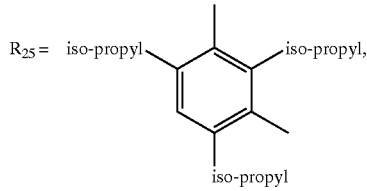

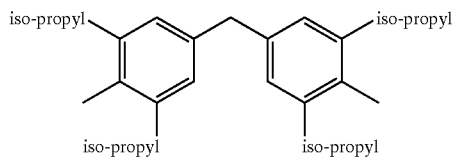

or

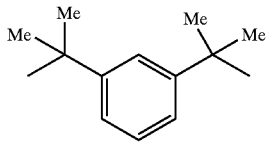

$R_{26}$=$C_1$–$C_{18}$-alkyl, -aryl, -arylalkyl, -alkylenoxyalkyl, -alkoxypolyoxyalkylene

Z=O, NH, S, n=2 to 100.

14. A polyurethane foam according to claim 12, wherein said at least one sterically hindered carbodiimide is a:

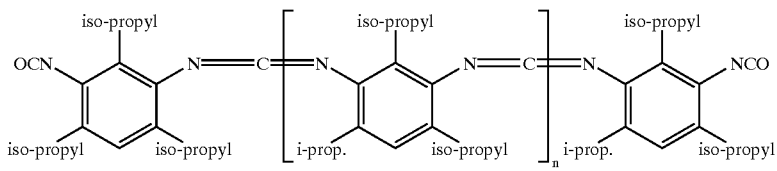

wherein n=2 to 100.

15. A polyurethane foam according to claim 12, wherein said at least one sterically hindered carbodiimide is a:

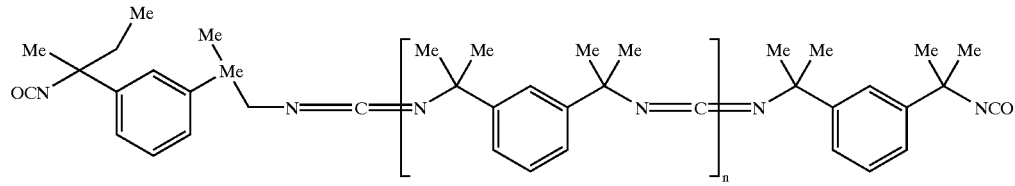

wherein n=2 to 100.

16. A polyurethane foam according to claim 12, wherein said at least one sterically hindered carbodiimide is a:

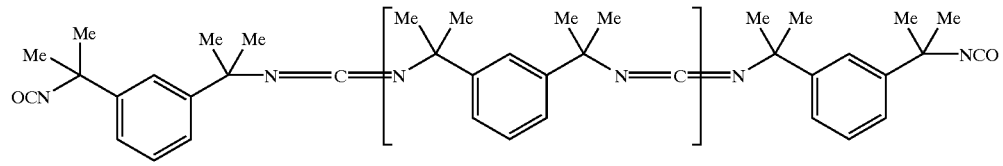

wherein n=2 to 100.

* * * * *